US005801721A

United States Patent [19]

Gandy et al.

[11] Patent Number: 5,801,721

[45] Date of Patent: Sep. 1, 1998

[54] APPARATUS FOR PRODUCING AN IMAGE ON A FIRST SIDE OF A SUBSTRATE AND A MIRROR IMAGE ON A SECOND SIDE OF THE SUBSTRATE

[75] Inventors: James Gandy; Jubayer Ahmed; Don Ray Janysek, all of San Antonio, Tex.

[73] Assignee: Signtech U.S.A. Ltd., San Antonio, Tex.

[21] Appl. No.: 303,701

[22] Filed: Sep. 9, 1994

[51] Int. Cl.[6] .......... H04N 1/034; B41J 29/38

[52] U.S. Cl. .......... 347/3; 347/5

[58] Field of Search .......... 347/3, 9, 15, 37; 358/298, 456, 462, 455, 465, 466, 500, 502

[56] References Cited

U.S. PATENT DOCUMENTS

| | | | |
|---|---|---|---|
| 2,278,940 | 4/1942 | Murphy . | |
| 3,230,303 | 1/1966 | Macovski et al. . | |
| 3,553,371 | 1/1971 | Suenaga . | |
| 3,615,383 | 10/1971 | Inoue | 96/1 |
| 3,763,308 | 10/1973 | Miyata et al. . | |
| 3,867,882 | 2/1975 | Ahlgren et al. . | |
| 4,146,900 | 3/1979 | Arnold . | |
| 4,281,333 | 7/1981 | Tsuzuki et al. . | |
| 4,345,012 | 8/1982 | Hirsch et al. | 430/48 |
| 4,403,228 | 9/1983 | Miura et al. . | |
| 4,404,572 | 9/1983 | Okamura et al. | 347/37 |
| 4,410,897 | 10/1983 | Moriguchi et al. . | |
| 4,448,522 | 5/1984 | Raush | 355/78 |
| 4,475,128 | 10/1984 | Koumura | 347/3 |
| 4,547,786 | 10/1985 | Logan et al. . | |
| 4,628,330 | 12/1986 | Suga et al. . | |
| 4,714,939 | 12/1987 | Ahern et al. | 355/3 TR |
| 4,766,921 | 8/1988 | Williams . | |
| 4,839,666 | 6/1989 | Jayne . | |
| 4,876,610 | 10/1989 | Ohsawa et al. | 358/456 |
| 4,914,522 | 4/1990 | Duffield et al. . | |
| 4,994,827 | 2/1991 | Jamzadeh et al. | 346/157 |
| 4,999,651 | 3/1991 | Duffield et al. . | |
| 5,144,328 | 9/1992 | Blake et al. | 347/101 |
| 5,294,946 | 3/1994 | Gandy et al. | 347/3 |
| 5,349,450 | 9/1994 | Yoshioka et al. | 358/502 |
| 5,376,957 | 12/1994 | Gandy et al. | 347/3 |

OTHER PUBLICATIONS

IBM Technical Disclosure Bulletin, vol. 22, No. 6 (Nov., 1979) Ink Jet Nozzle Design, W. L. Dollenmayer.

*Primary Examiner*—Benjamin R. Fuller
*Assistant Examiner*—L. Anderson
*Attorney, Agent, or Firm*—Christopher L. Makay; Donald R. Comuzzi

[57] ABSTRACT

A printing system includes a scanner, a graphics computer, and a printer. The scanner optically scans an image and reduces it to a series of pixels represented in gray scale. After the scanner finishes converting the image into pixels, the graphics computer converts the gray scale representations of each pixel into a pixel conveying uniform density color information. The graphics computer then outputs the uniform density pixels to a print control system of the printer. The print control system receives the uniform density pixels and controls a printhead to print a reproduction of the image on a substrate suspended within the printer. Alternatively, the print control system controls a pair of printheads positioned on opposite sides of the substrate suspended within the printer to print a reproduction of the image on one side of the substrate and a mirror of the image on the opposite side of the substrate such that the images are in registry.

5 Claims, 12 Drawing Sheets

APPARATUS FOR PRODUCING AN IMAGE ON A FIRST SIDE OF A SUBSTRATE AND A MIRROR IMAGE ON A SECOND SIDE OF THE SUBSTRATE

BACKGROUND OF THE INVENTION

1. Field of the Invention

The present invention relates to printing systems for reproducing and enlarging color images and, more particularly, but not by way of limitation, to a large format printing system designed for producing color reproductions on an imaging medium for numerous interior and exterior uses including, but not limited to signs, fleet graphics, backdrops, illuminated panels, architectural displays, and billboards.

2. Description of the Related Art

With the development of scanning techniques capable of accurately dividing a color image into a series of pixels with each pixel having a color and color density value represented by an electrical signal, systems that employ the electrical signals to reproduce photos, pictures, and the like into an enlarged image for use on signs, billboards, etc. have been developed. Those systems receive the scanned electrical signals and utilize them to control printheads so that they apply ink to the imaging medium in accordance with the color and color density of each pixel. That is, the systems actuate their printheads in response to the electrical signals such that the printheads deliver ink onto the imaging medium until the proper color density has been attained. Thus, gray scale printing attempts to reproduce the image as an enlarged exact replica of the original by varying the density of ink applied to the imaging medium so that each pixel contains the proper shade of color.

One such system is described in U.S. Pat. No. 3,553,371 which issued on Jan. 5, 1971 to Suenaga. The Suenaga patent discloses a method for producing an enlarged multicolored print by scanning an original picture. Electrical signals representative of the scanned picture are produced and used to control the rate of discharge of ink from a group of spray nozzles onto an imaging medium. Each electrical signal corresponds to a pixel and represents the density of the ink to be applied in the corresponding pixel. The electrical signals vary ink density by controlling both the amount of nozzle opening and the flow rate of compressed air past the nozzle. As the nozzles are opened, the variable stream of compressed air flows past the nozzle, thereby, picking up the ink and applying it to the imaging medium until the proper shade of color has been attained.

A similar system is described in U.S. Pat. No. 4,839,666 which issued Jun. 13, 1989 to Jayne. The Jayne patent discloses an image forming system that includes a control unit having a computer program stored therein. The computer program represents an image to be reproduced and directs the control unit. Under the direction of the computer program, the control unit develops signals that control a spray head to apply ink to an imaging medium. However, unlike the Suenaga patent, the image forming system of the Jayne patent varies the density of the ink applied to the imaging medium by modulating the length of time the spray head applies the ink rather than modulating the intensity of the ink flow from a spray head.

A system that incorporates features of both the Suenaga patent and the Jayne patent is U.S. Pat. No. 4,914,522 which issued Apr. 3, 1990 to Duffield et al. The Duffield et al. patent utilizes a scanner similar to that of the Suenaga patent to produce electrical signals representative of the scanned picture. However, similar to the Jayne patent, the image forming system of the Duffield et al. patent varies the density of the ink applied to an imaging medium by modulating the length of time the spray head applies the ink.

Unfortunately, gray scale printing systems such as those described above suffer from numerous disadvantages. For example, those systems cannot exactly reproduce an image because true gray scale printing requires 256 color density variations (i.e., shades of each color). However, due to printhead control system limitations, only 16 color density variations or limited gray scale due to hardware restrictions are available for application to the imaging medium, thereby, preventing exact image reproduction.

More importantly, printheads capable of producing gray scale images are extremely complex making them unreliable. The complex printheads must be cleaned often to prevent excess ink gathered about the printheads from changing the color density of subsequent pixels. That is, the actual color of the pixel sprayed is different from the desired color because the accumulated ink sprays onto the imaging media along with the correct amount of ink. These color changes are noticeable to the human eye and result in a reproduced image of poor quality. Additionally, gray scale reproductions are expensive and require significant investments of time because the image forming system must print every pixel of the scanned image to the correct color density.

Other systems capable of reproducing an image on an image medium from electrical signals representing image pixel color and color densities include line screen printer systems. Those systems receive the electrical signals and transform them into signals representing each pixel as a uniform matrix of dots with the number of dots in each matrix corresponding to the color density. For example, if the color density of a pixel is one third of the complete color density and the pixel matrices comprise nine dots, then the resulting pixel matrix will have three out of the nine possible dots. Once each pixel has been transformed, the systems employ the transformed signals to control printheads to produce the uniform matrices of dots representing each pixel on the imaging medium.

Line screen printing systems provide acceptable enlarged images because the uniform matrices of dots provide the illusion of gray scale printing. The reproduced image appears in gray scale because the uniform matrices of dots fool an observer's eyes into believing the image includes color tones and shades due to the spatial integration performed by the human eye. That is, an image formed from pixels comprised of uniform matrices of dots when viewed from a distance appear as a gray scale print because an observer's eyes will average the fine detail of the image and only record the overall intensity of the image. Accordingly, referring the above example, when viewing the pixel printed with three out of the nine possible dots from a distance, an observer's eye merges the three dots to provide the illusion of one third color density.

Although line screen printing systems fail to produce an image as sharp as a gray scale print, such systems require less complex printing equipment and thus print considerably faster. Unfortunately, the use of uniform matrices of dots produces ordered patterns called rosettas, which typically merge into moire patterns when viewed at a distance. The moire patterns cause a systematic arrangement noticeable to an observer that obscures the intended image so that the image quality is diminished or completely destroyed.

An attempt to prevent moire patterns from forming while still utilizing a line screen printing system is disclosed in U.S. Pat. No. 4,680,596 issued Jul. 14, 1987 to Logan. The Logan patent applies the line screen printing principals of dividing images into pixels comprised of a dot matrices, however, that system randomizes the placement of the dots within each pixel matrix in an attempt to prevent ordered arrangement of dots. The Logan system scans an image and reduces it to electrical signals representing the color and color density of each pixel. Each pixel is then compared to a pixel density value held in a table to determine the number of dots required for each dot matrix. After the number of dots in each matrix has been determined, a random number generator randomly selects the dot placement for each matrix. Each pixel is then reproduced on an imaging medium with the dot matrices printed with dots according to the random positions determined by the random number generator. Consequently, the dots within each matrix comprising a pixel appear less uniform so that rosetta patterns do not form. Although the dots forming the pixel matrices are printed randomly, each pixel is printed uniformly so that a visible patterns in the image still exists. These patterns are less notable to an observer' eyes, however, they are noticeable resulting in a lower quality image than a gray scale print.

Accordingly, a system that eliminates uniform patterns by randomly applying single density dots to an imaging medium to reproduce an image that provides a spatial integration that approximates gray scale printing is highly desirable.

SUMMARY OF THE INVENTION

In accordance with the present invention, a printing system includes a scanner, a graphics computer, and a printer. The printing system operates to print a reproduction of an original image on a substrate either on a single side of the substrate or as a double sided print. The double sided print consists of the original image printed on a first side of the substrate and a mirror of the original image printed on a second side of the substrate such that the two images are in registry.

The printing system receives an original image via the scanner, which optically scans the image and reduces it to a series of pixels represented in gray scale. After the scanner finishes converting the image into pixels, the graphics computer reads each pixel into its memory. The graphics computer includes a program that converts the gray scale representations of each pixel into a pixel conveying uniform density color information (i.e., each pixel has an intensity value of zero or one (i.e. on/off).

Once the graphics computer converts the gray scale pixels into single intensity pixels, the graphics computer transfers the pixels to a print control system of the printer. The print control system receives the single intensity pixels and controls a printhead to print a reproduction of image on a substrate suspended within the printer. Alternatively, the print control system controls a pair of printheads positioned on opposite sides of the substrate suspended within the printer to print a reproduction of the image on one side of the substrate and a mirror of the image on the opposite side of the substrate such that the images are in registry.

It is, therefore, an object of the present invention to provide a printing system with a scanner that scans an image to reduce the image to a series of gray scale pixels.

It is another object of the present invention to provide a printing system with a graphics computer that converts the gray scale pixels into a random arrangement of pixels having uniform color density.

It is a further object of the present invention to provide a printing system with a printer including a print control system that controls a printhead to print the uniform density pixels conveying color information on a substrate.

It is still a further object of the present invention to provide a printing system with a printer including a print control system that controls a pair of printheads positioned on opposite sides of a substrate to print the uniform density pixels conveying color information in registry on opposite sides of the substrate.

Still other objects, features, and advantages of the present invention will become evident to those skilled in the art in light of the following.

DETAILED DESCRIPTION OF THE PREFERRED EMBODIMENT

Figure 1:
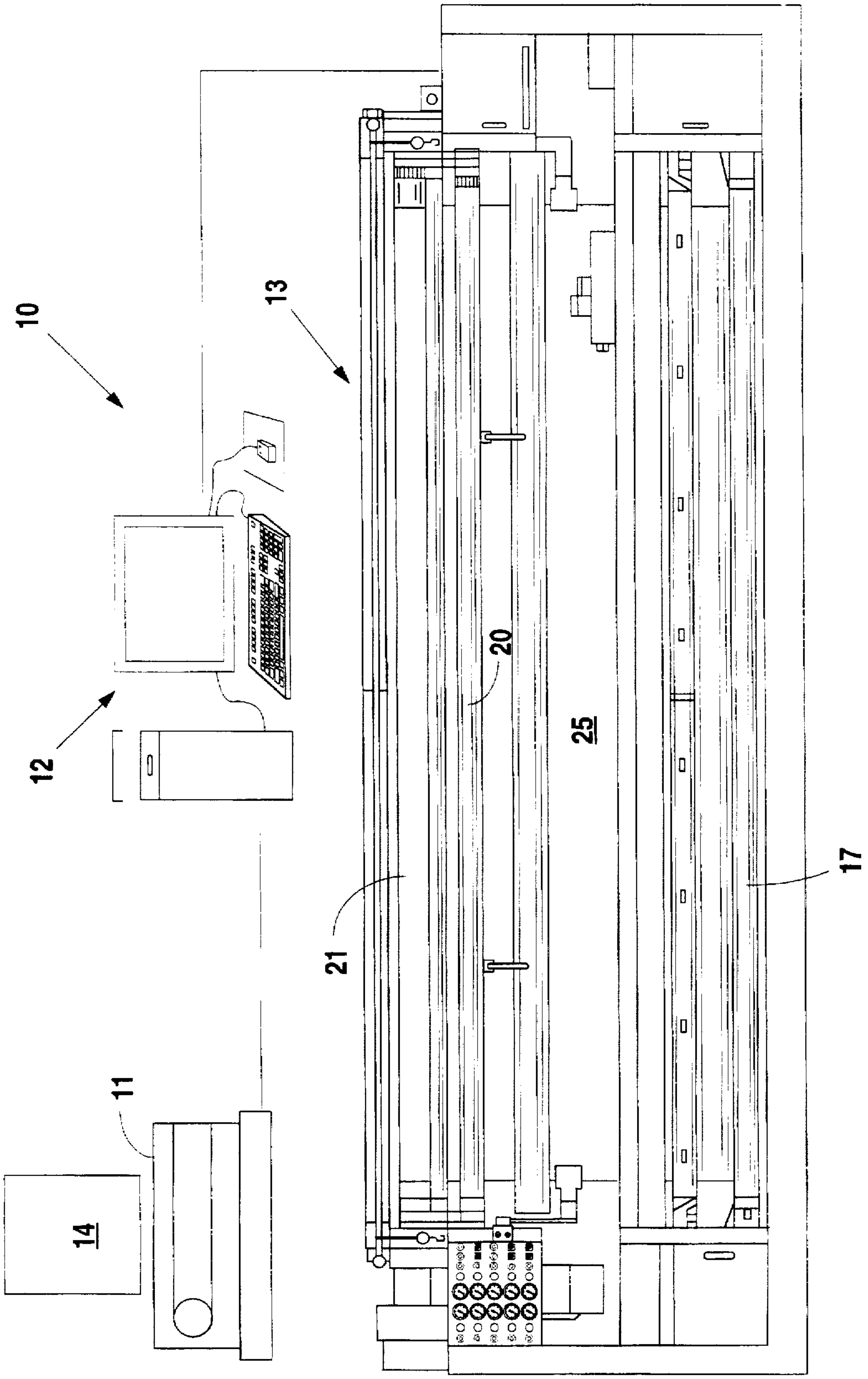
FIG. 1 is a schematic diagram illustrating the scanner, graphics computer, and printer of the printing system.

As illustrated in FIG. 1, printing system 10 includes scanner 11, graphics computer 12, and printer 13. Printing system 10 operates to print a reproduction of an original image on a substrate either on a single side of the substrate or as a double sided print. The double sided print consists of the original image printed on a first side of the substrate and a mirror of the original image printed on a second side of the substrate such that the two images are in registry.

Printing system 10 receives an original image 14 via scanner 11. Scanner 11 optically scans image 14 line by line and reduces each line into a series of pixels with each pixel represented by four electrical signals. Each electrical signal conveys gray scale pixel information which is a color in the pixel (i.e., cyan, magenta, yellow, and/or black) and the density of that color. In this preferred embodiment, scanner 11 may be any device suitable for scanning an image such as the desk top color scanner DT-S103OAI produced by the Dainippon Screen Manufacturing Company, Ltd.

After scanner 11 finishes converting image 14 into pixels, graphics computer 12 reads the four electrical signals representing each pixel into its memory. In this preferred embodiment, graphics 12 may be any standard PC such as a Macintosh personal computer manufactured by Apple Computer Company. Graphics computer 12 includes a program that converts the gray scale representations of each pixel into a pixel having a uniform color density. That is, the color density signals for each of the four colors representing each pixel are converted from the variable gray scale density representations into a uniform color density corresponding to an intensity value of zero or one (i.e. on/off). Graphics computer also includes a display screen that allows a user to display the converted image before printing.

In this preferred embodiment, the program that converts each gray scale pixel representation of image 14 into a single color density representation is an error diffusion algorithm. The error diffusion algorithm operates by dividing image 14 into areas containing a predetermined number of gray scale pixels. Each color density for the four colors representing each pixel are compared to a predetermined density value for the color, and, if the pixel density value for that color is greater than the predetermined density value, the pixel is represented by a one (i.e., on) which corresponds to full color intensity, otherwise, the pixel is represented by a zero (i.e., off) which corresponds to no color.

Graphics computer 12 compares the color densities for each of the four colors representing the pixels in each of the pixel areas to the predetermined density value for the particular color to convert the pixels into single density representations of the four colors. However, the error diffusion algorithm compensates for the conversion in pixel densities by altering the color density of each subsequent pixel by the difference in density between the previously converted pixel and the predetermined color density value. By performing the above error correction, graphics computer 12 can represent each area of image 14 with pixels having a uniform density value, either 0 or 1, because, although the density of each of the four colors representing each pixel is different, the overall value of color intensity produced by the pixels in each is equal to the color intensity of a gray scale representation of image 14.

Although the preferred embodiment employs an error diffusion algorithm, any algorithm that converts a gray scale image into an image represented by single color density pixels, such as an ordered dither algorithm, may be utilized to control graphics computer 12. Examples of an error diffusion algorithm and other suitable algorithms may be found in the book *Digital Half Toning* authored by Robert Ulichney and published by the MIT Press, Cambridge, Mass. copyright 1987.

Once graphics computer 12 has converted each pixel in each of the areas of image 14 into a pixel data signal representing a single color density, graphics computer 12 transfers those data signals to print control system 104 of printer 13 (described herein with reference to FIGS. 12A and 12B). Print control system receives the pixel data signals and controls a printhead to print a reproduction of image 14 on a substrate suspended within printer 13. Alternatively, print control system 104 controls a pair of printheads positioned on opposite sides of a substrate to print a reproduction of image 14 on one side of the substrate and a mirror of image 14 on the opposite side of the substrate such that the images are in registry.

Figure 2:
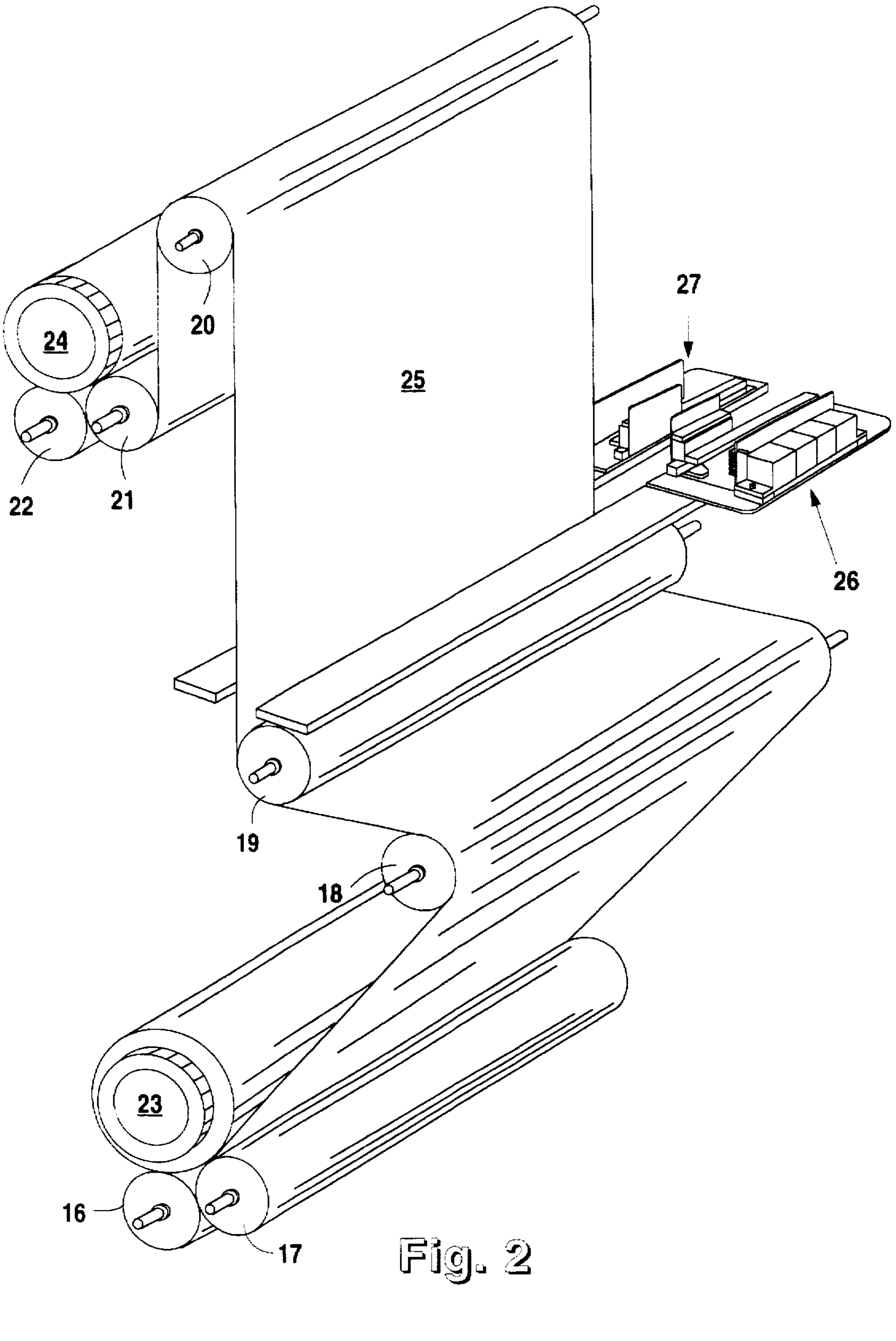
FIG. 2 is partial perspective view illustrating the rollers and dual printheads of the double sided printer configuration of the printing system.
Figure 3:
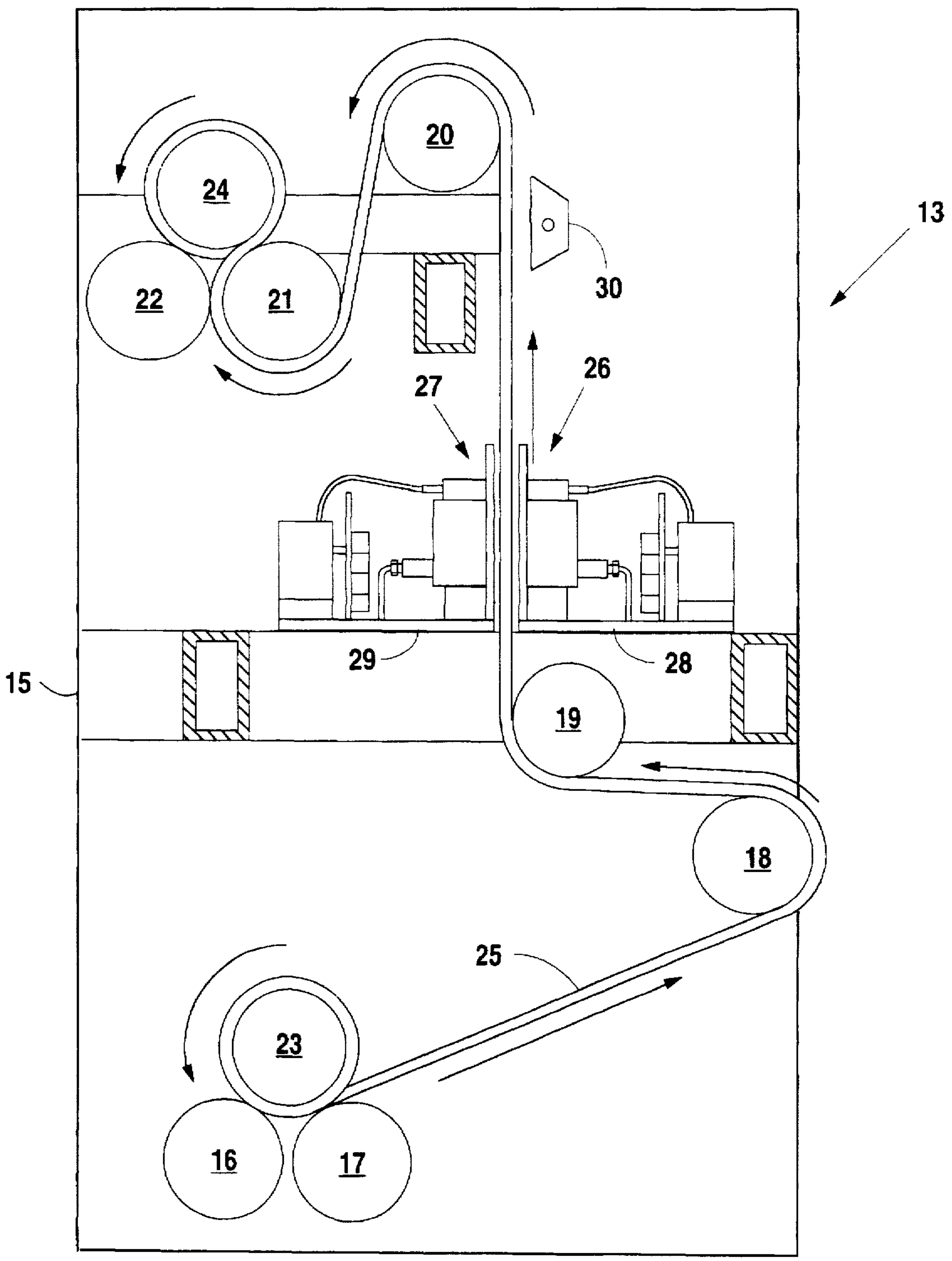
FIG. 3 is a partial side plan view illustrating the rollers and dual printheads of the double-sided printer configuration of the printing system.

As illustrated in FIGS. 1–3, printer 13 includes frame 15 which houses rollers 16–22 that support substrate 25 within frame 15. In this preferred embodiment, substrate 25 is a flex-face vinyl-type substrate onto which image 14 is printed. Each of rollers 16–22 mounts within frame 15 using any suitable means such as a pair of brackets attached to frame 15 that include a bearing that receives a roller to permit its rotation. Additionally, printer 13 includes heat lamp 30 mounted onto frame 15 in close proximity to substrate 25 at a position above printheads 26 and 27. Heat lamp 30 applies heat to substrate 25 after the printing of image 14 to decrease the drying time of the ink forming image 14.

To suspend substrate 25 within printer 13, roller 23 which includes substrate 25 wound thereabout is placed on rollers 16 and 17. Rollers 16 and 17 support roller 23 in a shaftless unwind/feed system that allows substrate 25 to unroll freely from roller 23 towards roller 18. Rollers 18–20 alternate between opposing sides of substrate 25 to maintain tension on substrate 25 as it passes printheads 26 and 27 which print image 14 thereon. Additionally, roller 19 functions as a drive roller to facilitate the unwinding of substrate 25 from roller 23. Roller 19 is driven using any suitable means such as a stepper motor connected to one end of roller 19 via a chain drive or gear drive system.

From roller 20, substrate 25 passes around roller 21 and between rollers 21 and 22 to roller 24. Rollers 21 and 22 support roller 24 in a shaftless rewind system that permits the rolling of substrate 25 around roller 24 after the printing of image 14 thereon. Rollers 21 and 22 further function to assist roller 19 in driving substrate 25 past printheads 26 and 27. Accordingly, rollers 21 and 22 connect to any suitable drive means such as a stepper motor that connects to one end of rollers 21 and 22 utilizing a chain drive or gear drive system. Thus, rollers 16–22 support substrate 25 within printer 13 and rollers 19, 21, and 22 drive substrate 25 past printheads 26 and 27 which reproduce image 14 on both sides of substrate 25. Once image 14 and its mirror image have been applied to substrate 25, roller 24 is removed from the top of rollers 21 and 22 using any suitable means such as a crane.

Printheads 26 and 27 each reside on a carriage that slidably mounts onto rails 28 and 29, respectively, to permit printheads 26 and 27 to traverse their respective rails 28 and 29. Each carriage attaches to a drive cable or belt wound about a drum roller mounted at one end of frame 15 and a pulley mounted at the opposite end of frame 15. A bidirectional motor connects to the drum roller to rotatably drive it. As the bidirectional motor drives the drum roller in a first direction, the drive cables or belts unwind from a first side of the drum roller and travel around the pulley to a second side of the drum roller where they wind onto the second side. As a result, the carriages are driven across their respective rails in a first direction. At the end of a line, the bidirectional motor reverses direction to drive the drum roller in a second direction that unwinds the drive cables from the second side of the drum roller to its first side. Consequently, the carriages are driven back across their respective rails in a second direction. Accordingly, as the bidirectional motor reverses directions at the end of each line, the carriages and thus printheads 26 and 27 are alternately pulled back and forth across their respective rails 28 and 29 to permit the printing of image 14 onto both sides of substrate 25.

Figure 4:
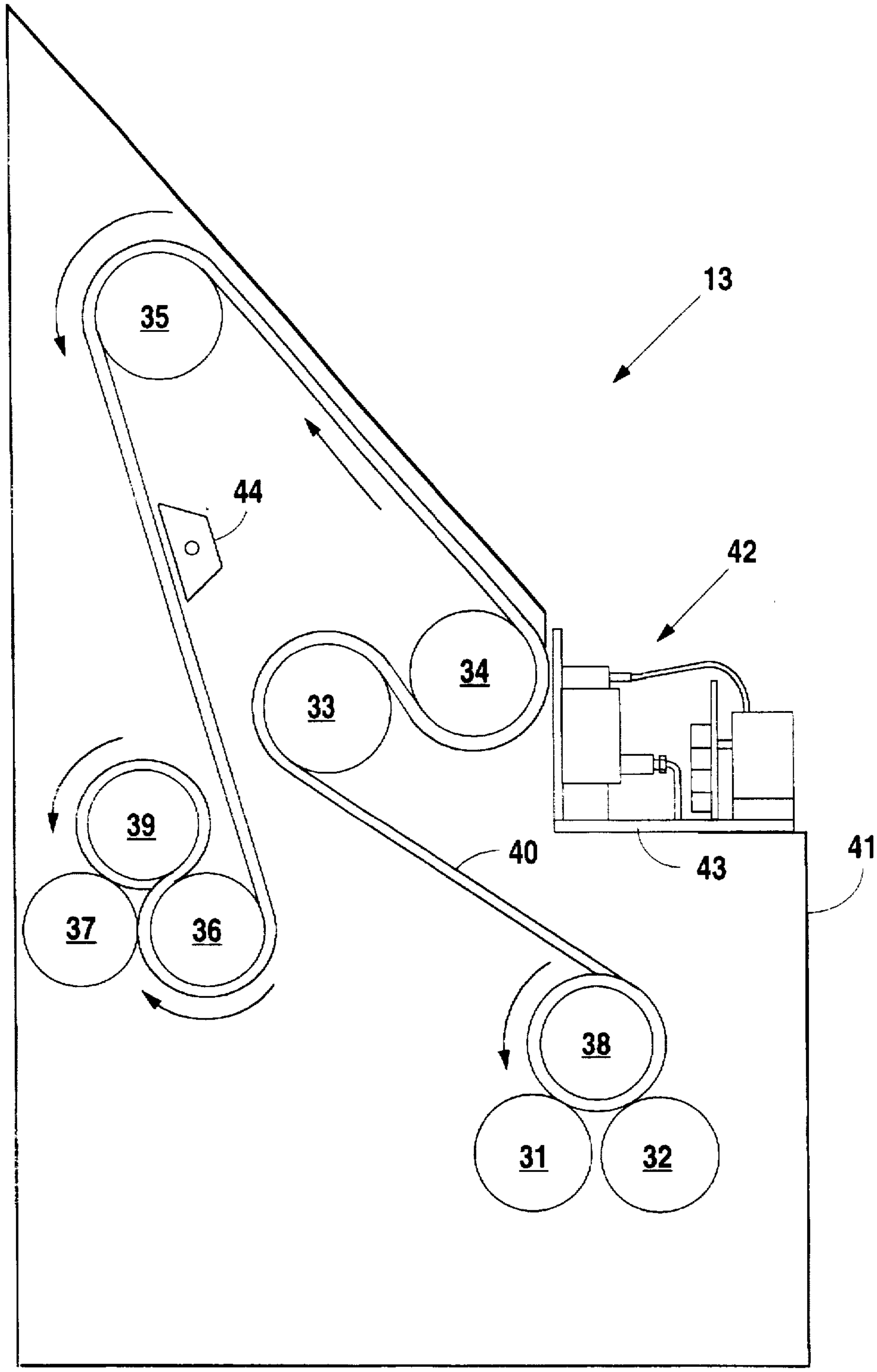
FIG. 4 is a partial side plan view illustrating the rollers and printhead of the single-sided printer configuration of the printing system.

As illustrated in FIG. 4, an alternative embodiment of printer 13 reproduces image 14 on only one side of a substrate. The alternative embodiment of printer 13 includes frame 41 which houses rollers 31–37 that support substrate 40 within frame 41. Rollers 31–37 correspond to rollers 16–22 and operate identically to support and transport substrate 40 within frame 41. Similar to rollers 23 and 24, roller 38 is an unwind roller about which substrate 40 resides, and roller 39 is a take-up roller that receives substrate 40 after the printing of image 14 on one side of substrate 40. Printhead 42 is identical to both printheads 26 and 27 and includes a similar carriage that resides on rail 43 and permits the driving of printhead 42 transverse to substrate 40. Frame 41 also includes heater 44 which is identical to heater 30 and thus enhances the drying of the ink forming image 14.

Figure 5:
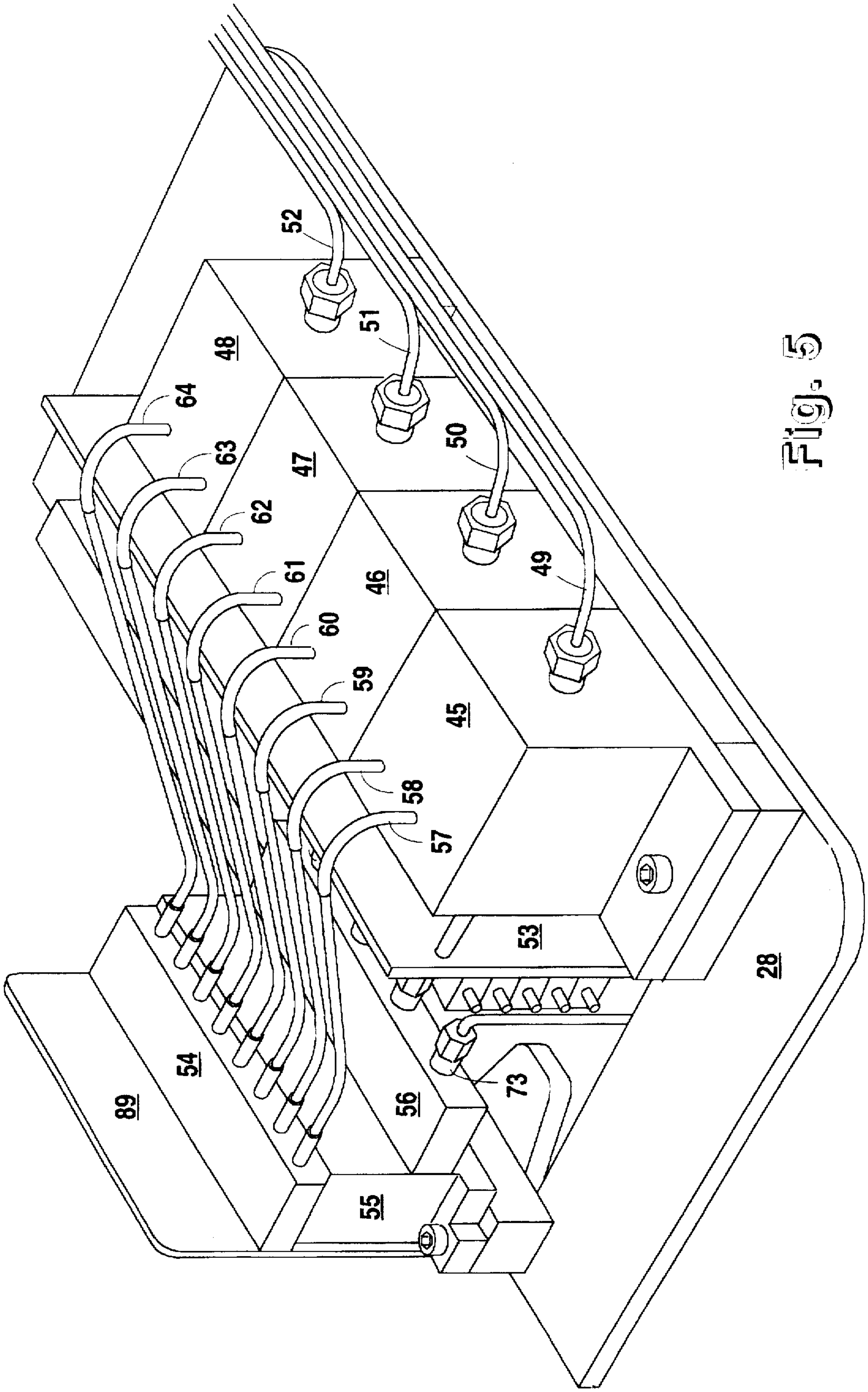
FIG. 5 is a perspective view of a first embodiment of the printheads of the printing system printer.

As illustrated in FIG. 5, a first embodiment of printhead 26 includes ink reservoirs 45–48, ink jet block 54, valve block 55, and manifold 56 which are mounted on carriage 28. Printheads 27 and 42 are not described because they are identical to printhead 26 both in design and operation. Printhead 26 includes ink reservoirs 45–48 to provide intermediate ink storage before ink application to substrate 25. Each of ink reservoirs 45–48 connects to a separate ink tank (not shown) of printing system 10 via lines 49–52, respectively. Each of the four separate ink tanks contains one of the four basic colors (i.e., cyan, magenta, yellow, and black) necessary to produce the complete spectrum of colors. Consequently, each one of ink reservoirs 45–48 holds one of the colors cyan, magenta, yellow, and black. For the purpose of illustration, if the desired color to be produced on substrate 25 is purple, printhead 26 delivers the color cyan from ink reservoir 45 to a pixel on substrate 25 followed by magenta from ink reservoir 36 to the same pixel on substrate 25, resulting in a color mix producing purple.

Each of ink reservoirs 45–48 includes a sensor (not shown) coupled to print controller 105 (described herein with reference to FIG. 9) to provide print controller 105 with a signal indicating the level of ink within each of reservoirs 45–48. When a sensor indicates a minimum level of ink within its ink reservoir (45–48), print controller 104 opens a valve controlling the flow of ink through that ink reservoir's line (49–52) to allow the delivery of ink from the ink tank into the ink reservoir. Alternatively, when the sensor indicates a maximum level of ink within the ink reservoir, print controller 104 closes the valve controlling the flow of ink through the line 49–52 to stop the delivery of ink from the ink tank to the ink reservoir. Furthermore, each of ink reservoirs 45–48 includes an aperture communicating with the atmosphere to ensure the ink flows from printhead 26 in a smooth, constant stream that prevents improper pixel printing. Additionally, printhead 26 includes shield 89 that blocks ink overspray and splattering to prevent an accumulation of ink on printhead 26 that damages printhead 26.

Printhead 26 includes ink jet block 54, valve block 55, and manifold 56 to deliver ink from ink reservoirs 45–48 onto substrate 25. The printing of image 14 onto substrate 25 requires ink jet block 54 include only one ink jet coupled to each of ink reservoirs 45–48. In that configuration, printhead 26 prints one line of pixels at a time which is a time intensive process.

Accordingly, ink jet block 54 includes four columns of ink jets with each column of ink jets coupled to one of ink reservoirs 45–48 so that a plurality of rows may be printed simultaneously. In this preferred embodiment, each column includes eight ink jets connected to one of ink reservoirs 45–48 to produce a total of 32 ink jets in ink jet block 54. Although each set of eight ink jets are aligned along a vertical axis, the individual ink jets forming each of the four columns are offset horizontally to prevent ink sprayed from one ink jet from interfering with the remaining seven ink jets.

Each of ink reservoirs 45–48 includes a manifold (not shown) mounted to its lid. The manifolds each include an inlet communicating with its ink reservoir and eight outlets to correspond to the number of ink jets in the four ink jet columns. Each manifold outlet connects to an individual ink distribution line contained in groups of four lines within one of hoses 57–64. Hoses 57–64 attach to ink jet block 54 to feed the individual ink distribution lines contained therein into ink jet block 54. Each of the individual ink distribution lines connects to an ink jet of ink jet block 54 to supply ink from ink reservoirs to the individual ink jets forming the four ink jet columns. Although the four ink jet columns have been described as including eight individual ink jets, one of ordinary skill in the art will recognize that any number of ink jets may form a column.

Figure 6:
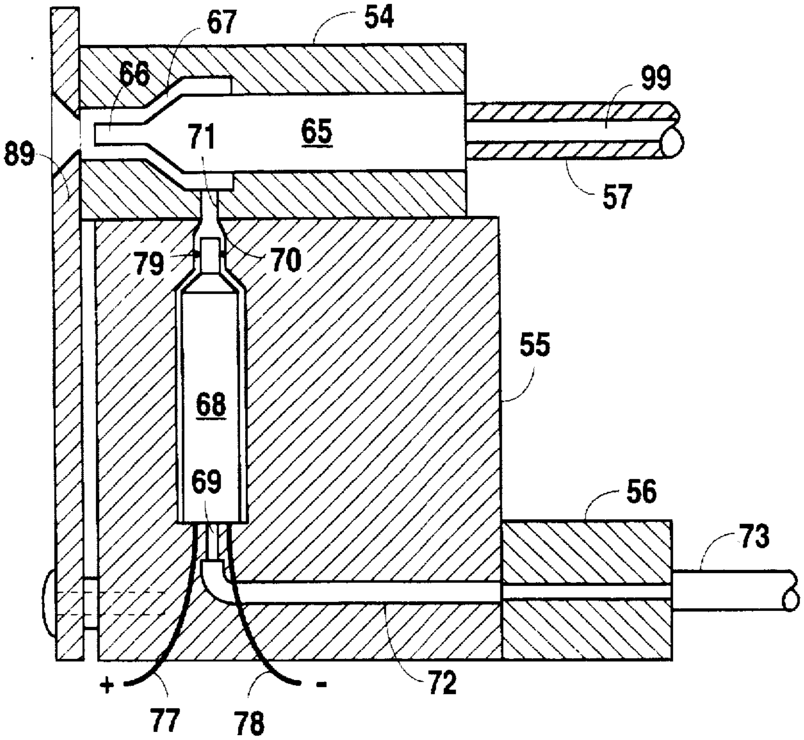
FIG. 6 is a partial side plan view in cross-section of the first embodiment of the printheads of the printing system printer.

As illustrated in FIG. 6, ink jet block 54 houses ink jet 65 that communicates at an inlet with ink reservoir 45 via ink distribution line 99 contained within hose 57. Ink jet, 65 includes nozzle 66 which is surrounded by cavity 67 defined by the interior of ink jet block 54. Valve block 55 contains valve 68 that includes an inlet 69 and an outlet 70 that communicates with cavity 67 via passageway 71. O-ring 79 resides around outlet 70 of valve 68 to provide a fluid seal for valve 68 within passageway 71. Valve 68 further includes electrical leads 77 and 78 that connect to a relay (not shown) mounted on driver board 53. In this preferred embodiment, valve 68 is a solenoid operated valve that opens upon the application of power. Manifold 56 communicates with a constant pressure source of air (not shown) via line 73 to communicate air at a constant pressure to inlet 69 of valve 68 through passageway 72. ink jet 65 requires activation to apply ink to substrate 25, print control system 104 outputs a strobe signal to its relay on driver board 53 connected to electrical leads 77 and 78 of valve 68. The strobe signal actuates the relay to connect valve 68 to a power source that delivers power to valve 68 via electrical leads 77 and 78. In response to the power signal, valve 68 opens to deliver air at a constant pressure from the constant pressure air source into cavity 67 of ink jet block 54. As the pressurized air flows from cavity 67, it creates a low pressure region about nozzle 66 that draws ink from ink reservoir 45 into ink jet 65 via ink distribution line 99. Ink jet 65 ejects the ink from ink reservoir 45 out nozzle 66 and onto substrate 25 to form a pixel. Ink jet 65 applies ink to substrate 25 as long as print control system 104 outputs the strobe signal to the relay on driver board 53. Print control system 104 outputs the strobe signal for the same time period upon each activation of valve 68 so that the length of time valve 68 opens is constant for each pixel. The activation time period for valve 68 remains constant because each pixel of image 14 reproduced on substrate 25 is printed to the same density.

Although only ink jet 65 and valve 68 have been described, the configuration of the ink jets and their valves throughout ink jet block 54 and valve block 55 is identical, with the number of ink jets and valves corresponding to the desired number of lines to be printed simultaneously. Similarly, manifold 56 includes a number of passageways corresponding to the number of valves, while driver 53 includes a number of relays that corresponds to the number of valves.

Figure 7:
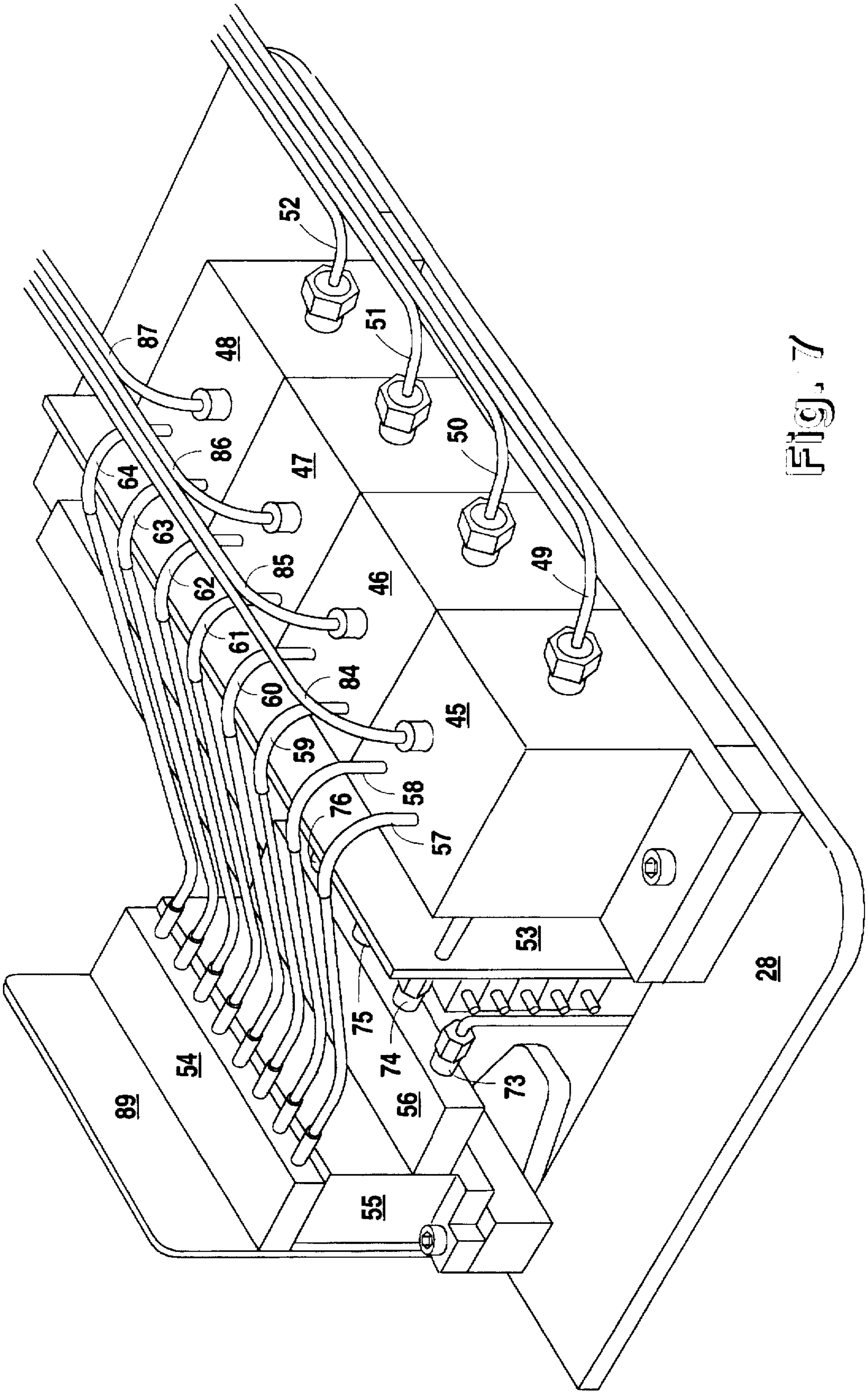
FIG. 7 is a perspective view of a second embodiment of the printheads of the printing system printer.

As illustrated in FIG. 7, a second embodiment of printhead 26 includes ink reservoirs 45–48, ink jet block 54, and manifold 150 which are mounted on carriage 28. Components of the second embodiment of printhead 26 that are identical to components of the first embodiment of printhead 26 are labelled with identical numbers. Printheads 27 and 42 are not described because they are identical to printhead 26 both in design and operation. Ink reservoirs 45–48 of the second embodiment are identical to ink reservoirs 45–48 of the first embodiment, except ink reservoirs 45–48 of the second embodiment communicate with a constant pressure source of air via lines 84–87, respectively, to pressurize the ink held within each of ink reservoirs 45–48.

Figure 8:
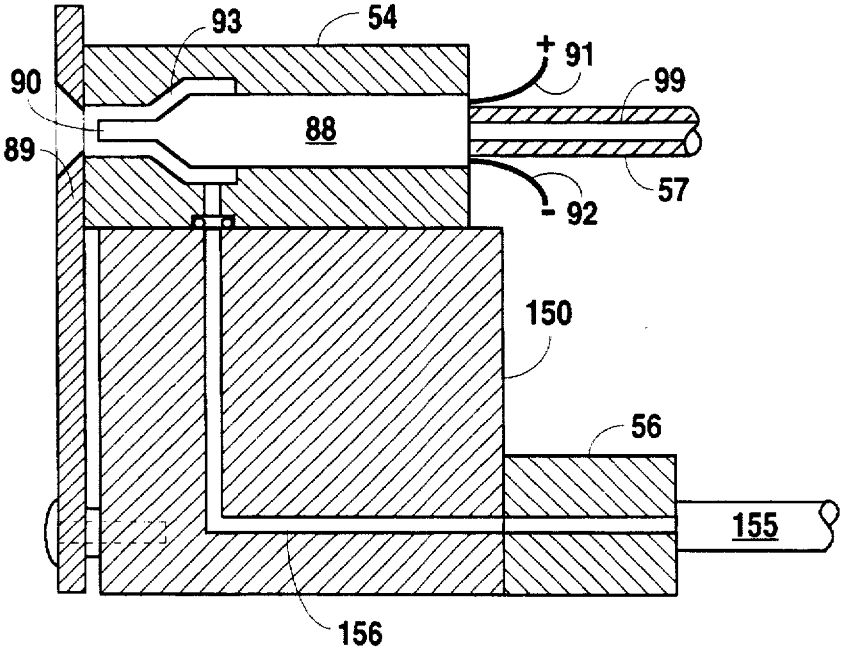
FIG. 8 is a partial side plan view in cross-section of the second embodiment of the printheads of the printing system printer.

As illustrated in FIG. 8, ink jet block 54 houses ink jet valve 88 that communicates at an inlet with ink reservoir 45 via ink distribution line 99 contained within hose 57. Ink jet valve 88 includes nozzle 90 which is surrounded by cavity 93 defined by the interior of ink jet block 54. Ink jet valve 88 further includes electrical leads 91 and 92 that connect to a relay (not shown) mounted on driver board 53. In this preferred embodiment, ink jet valve 88 is an ink jet printing solenoid valve sold by The Lee Company. Manifold 150 communicates with a constant pressure source of air (not shown) via line 155 to communicate air at a constant pressure to cavity 93 of ink jet block 54 through passageway 156.

When ink jet valve 88 requires activation to apply ink to substrate 25, print control system 104 outputs a strobe signal to its relay on driver board 53 connected to electrical leads 91 and 92 of ink jet valve 88. The strobe signal actuates the relay to connect ink jet valve 88 to a power source that delivers power to ink jet valve 88 via electrical leads 91 and 92. In response to the power signal, ink jet valve 88 opens so that ink flows from ink reservoir 45 into ink jet valve 88 via ink distribution line 99 because the ink within ink reservoir 45 is pressurized. Ink jet valve 88 ejects the pressurized ink from ink reservoir 45 out nozzle 90 and onto substrate 25 to form a pixel. Ink jet valve 88 applies ink to substrate 25 as long as print control system 104 outputs the strobe signal to the relay on driver board 53. Print control system 104 outputs the strobe signal for the same time period upon each activation of ink jet valve 88 so that the length of time ink jet valve 88 opens is constant for each pixel. The activation time period for ink jet valve 88 remains constant because each pixel of image 14 reproduced on substrate 25 is printed to the same density.

Manifold 150 continuously delivers air at a constant pressure into cavity 93 about nozzle 90 via line 155 and passageway 156 because there is no flow control valve within either line 155 or passageway 156. However, the pressure of the pressurized air source is insufficient to create a low pressure that draws ink from ink jet valve 88. Consequently, the constant pressure air functions only to atomize the ink flowing from ink jet valve 88 to produce an air brush effect on the ink applied to substrate 25 by ink jet valve 88.

Although only ink jet valve 88 has been described, the configuration of the ink jet valves throughout ink jet block 54 is identical, with the number of ink jet valves corresponding to the desired number of lines to be printed simultaneously. Similarly, manifold 150 includes a number of passageways corresponding to the number of ink jet valves, while driver board 53 includes a number of relays that corresponds to the number of ink jet valves.

Figure 9:
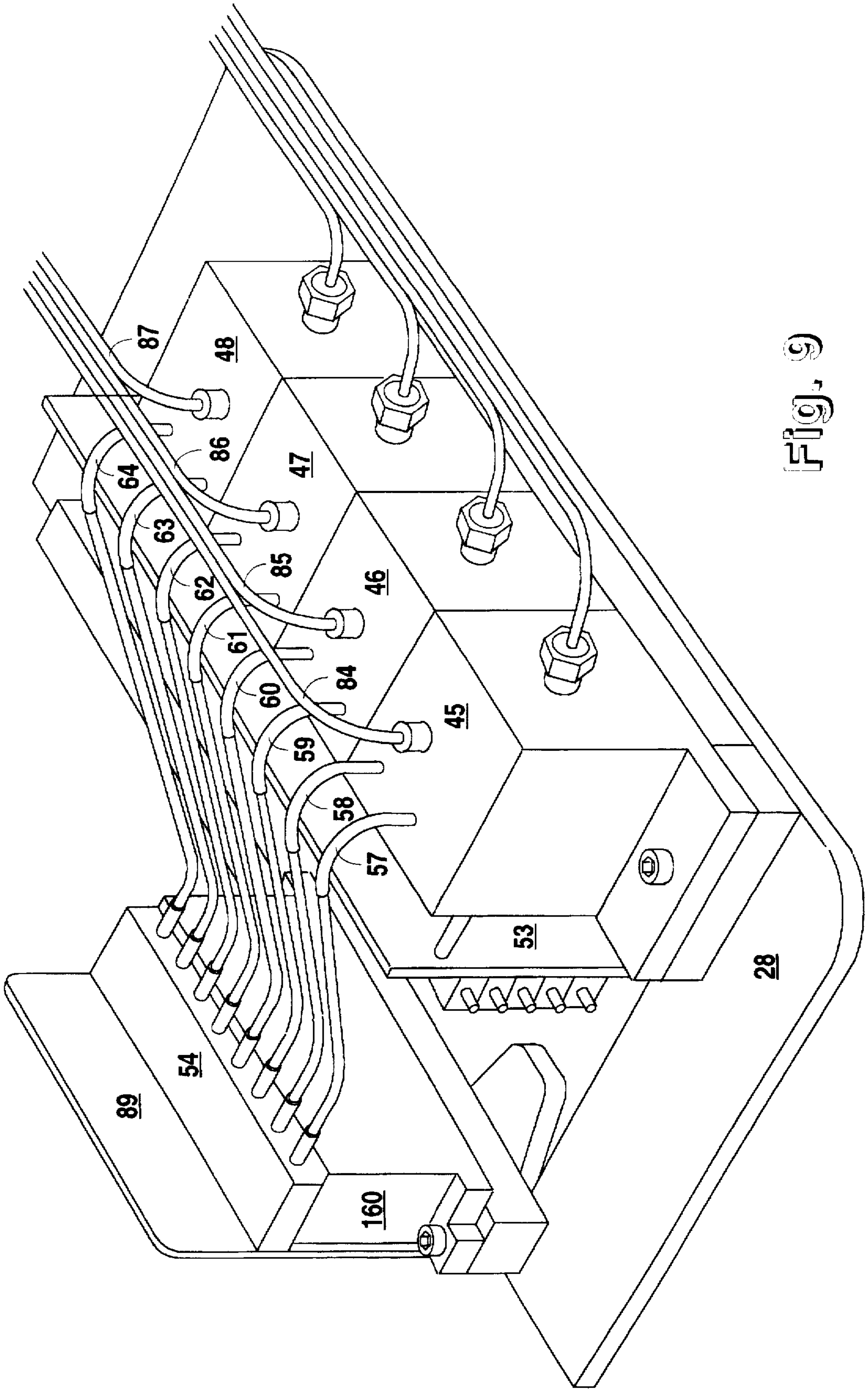
FIG. 9 is a perspective view of a third embodiment of the printheads of the printing system printer.

As illustrated in FIG. 9, the third embodiment of printhead 26 includes ink reservoirs 45–48, ink jet block 54, and block 160 which are mounted on carriage 28. Components of the third embodiment of printhead 26 that are identical to components of the first and second embodiments of printhead 26 are labelled with identical numbers. Printheads 27 and 42 are not described because they are identical to printhead 26 both in design and operation. Ink reservoirs 45–48 of the third embodiment are identical to ink reservoirs 45–48 of the second embodiment and thus include air lines 84–87 that communicate with a constant pressure source of air to pressurize the ink held within each of ink reservoirs 45–48.

Figure 10:
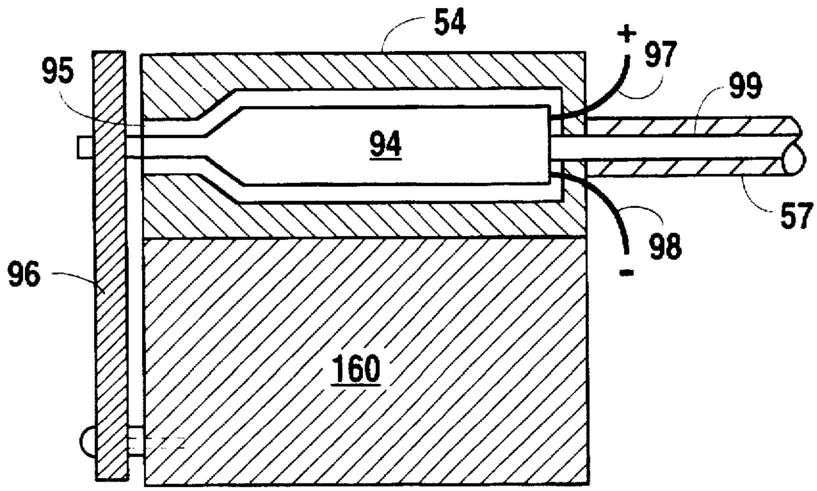
FIG. 10 is a partial side plan view in cross-section of the third embodiment of the printheads of the printing system printer.

As illustrated in FIG. 10, ink jet block 54 houses ink jet valve 94 that communicates at an inlet with ink reservoir 45 via ink distribution line 99 contained within hose 57. Ink jet valve 94 includes nozzle 95 that extends from ink jet block 54 and through shield 96. Ink jet valve 94 further includes electrical leads 97 and 98 that connect to a relay (not shown) mounted on driver board 53. In this preferred embodiment, ink jet valve 94 is an ink jet printing solenoid valve sold by The Lee Company. 96 is similar to shield 89 and thus blocks ink overspray and splattering to prevent an accumulation of ink on printhead 26 that damages printhead 26. However, unlike shield 89, shield 96 completely encloses nozzle 95 because there is no application of pressurized air about nozzle 95. Thus, the third embodiment does not include an air manifold, and block 160 merely supports ink jet block 54 at the appropriate position on carriage 28.

When ink jet valve 94 requires activation to apply ink to substrate 25, print control system 104 outputs a strobe signal to its relay on driver board 53 connected to electrical leads 97 and 98 of ink jet valve 88. The strobe signal actuates the relay to connect ink jet valve 94 to a power source that delivers power to ink jet valve 94 via electrical leads 97 and 98. In response to the power signal, ink jet valve 94 opens so that ink flows from ink reservoir 45 into ink jet valve 94 via ink distribution line 99 because the ink within ink reservoir 45 is pressurized. Ink jet valve 94 ejects the pressurized ink from ink reservoir 45 out nozzle 95 and onto substrate 25 to form a pixel. Ink jet valve 94 applies ink to substrate 25 as long as print control system 104 outputs the strobe signal to the relay of driver board 53. Print control system 104 outputs the strobe signal for the same time period upon each activation of ink jet valve 94 so that the length of time ink jet valve 94 opens is constant for each pixel. The activation time period for ink jet valve 94 remains constant because each pixel of image 14 reproduced on substrate 25 is printed to the same density.

Although only ink jet valve 94 has been described, the configuration of the ink jet valves throughout ink jet block 54 is identical, with the number of ink jet valves corresponding to the desired number of lines to be printed simultaneously. Similarly, driver board 53 includes a number of relays corresponding to the number of ink jet valves.

Figure 11:
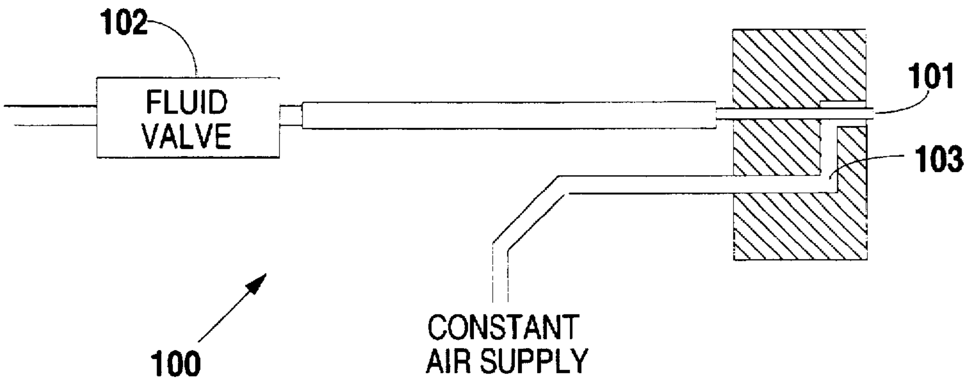
FIG. 11 is a schematic diagram illustrating the clear coating sprayhead of the printing system printer.

As illustrated in FIG. 11, a clear coating sprayhead 100 may be optionally attached to printheads 26 and 27 or printhead 42 to spray a protective clear coating over the image printed on substrate 25. That is, clear coating sprayhead 100 resides above each printheads 26 and 27 or printhead 42 so that, once a line has been completed and substrate 25 scrolled to permit the printing of the next line, clear coating sprayhead 100 applies a protective coating over the freshly printed line. Clear coating sprayhead 100 includes nozzle 101 which is in fluid communication with a pressurized clear ink source (not shown) via fluid valve 102. Additionally, nozzle 101 communicates with a constant pressure air source (not shown) via passage 103.

Similar to printheads 26 and 27 or printhead 42 in their second embodiments, clear coating spray head 100 modulates the flow of the pressurized clear coating ink with the air flow from the constant pressure air source being continuous. At the beginning of each line, fluid valve 102 opens to permit the flow of the clear coating ink from nozzle 101. The air flowing across nozzle 101 atomizes the clear coating ink flowing from nozzle 101 to aid in its application to substrate 25. At the end of the line, fluid valve 102 closes, thereby stopping the flow of clear coating ink from nozzle 101. On the next run of printheads 26 and 27 or printhead 42, fluid valve 102 again opens to repeat the above-described process. Thus, after the entire print operation is completed, the image reproduced on substrate 25 is covered with a clear protective coating of ink.

As illustrated in FIG. 12A, scanner 11 scans an image and converts it into individual pixels represented by four electrical signals that convey the color, either cyan, magenta, yellow, and/or black, and the density of each of those colors required to produce the individual pixel. The four color and color density signals of each pixel provide a gray scale representation of the image. Scanner 11 inputs that gray scale representation of each pixel into graphics computer 12 that converts the four gray scale color and color density signals into a four color signals represented by either no color or color at full intensity. In other words, graphics computer 12 converts the gray scale pixels of the image into pixels represented by four color on/off signals that approximate the image. Graphics computer 12 includes a display monitor, which may be any conventional CRT, to visually display the converted image pixels to illustrate how the reproduced image will appear when printed on a substrate.

As illustrated in FIGS. 12A and 12B, print control system 104 includes print controller 105, memory 106, encoder 107, counter 108, precision time generator 109, data register 110, clock 111, counter 112, shift register 113, RS-422 output 114, carriage drivers 125, material driver 126, and driver board 53 which includes RS-422 receiver 115, shift register 116 and relays 117. Once graphics computer 12 converts the scanned image, it inputs each line of converted pixels to print controller 105 which stores them in memory 106. In this preferred embodiment, print controller 105 may be any microprocessor such as the 486 processor produced by Intel, while memory 106 may be any dynamic memory such as a hard disk drive. Each converted pixel received by print controller 105 is represented by four electrical signals that are actually four bits of digital data. The four pixel bits/bytes of data convey the on/off information for the printhead valves controlling the application of each of the four colors (i.e., cyan, magenta, yellow, and black) necessary to produce a pixel of the desired color. The valves controlled by print controller 105 are either air valves as described with reference to FIG. 6 or ink jet valves as described with reference to FIGS. 8 and 10.

After each line of converted pixels has been stored in memory 106, print operations begin with printhead 26 travelling to a position at the far left of rail 28. When printhead 26 reaches its extreme left position, encoder 107 clears (i.e., it zeros out) to furnish a reference position for printhead 26. During the reference positioning of printhead 26, print controller 105 reads the first n-lines of converted image pixels from memory 106 into its memory. The number of lines print controller reads into its memory depends upon the number of lines that printhead 26 is capable of printing simultaneously (eight lines in this preferred embodiment). Print controller 105 reads eight lines at a time from memory 106 because, in this preferred embodiment, printhead 26 includes eight ink jets per column for each of the four required colors to reproduce eight lines of the scanned image simultaneously. Although eight lines may be printed simultaneously in this preferred embodiment, one skilled in the art will recognize that any number of lines may be reproduced.

After reading the first eight lines of the image into its memory, print controller 105 outputs a carriage control signal to carriage drivers 125 to begin the driving of printheads 26 along rail 28. Carriage drivers 125 activate in response to the carriage control signal to couple the bidirectional motor driving printhead 26 to a power source (not shown) capable of providing the current levels required to operate the bidirectional motor. In this preferred embodiment, carriage drivers 125 are H-type bridge servo-amplifiers that regulate power delivery to the bidirectional motor in accordance with the carriage control signal to govern the speed and thus the position of printhead 26 on rail 28.

As printhead 26 begins to traverse substrate 25, encoder 107 outputs to print controller 105 a carriage location signal representative of the distance that printhead 26 has travelled along rail 28. In this preferred embodiment, encoder 107 is an optical encoder that generates a count each time the carriage of printhead 26 travels a predetermined distance along its rail. For the purposes of illustration, encoder 107 could output a count every 1/144th of an inch. Print controller 105 processes the number of counts output from encoder 107 to determine the distance of travel for printhead 26 and thus its position on rail 28 with respect to substrate 25. Furthermore, print controller 105 processes the time between successive counts so that it can determine the speed of travel for printhead 26 along rail.

Print controller 105 determines the speed and position of printhead 26 on rail 28 with respect to substrate 25 to permit concise control over the driving of printhead 26. That is, printhead 26 must travel at a uniform speed and reach each pixel at correct time to ensure that each pixel is printed properly. However, due to inherent system inaccuracies such as the efficiency and age of the bidirectional motor, variations in speed and thus location of printhead 26 relative to substrate 25 occur.

Consequently, the feedback provided from encoder 107 prevents incorrect pixel placement because print controller 105 adjusts its carriage control signal in accordance with the actual speed and position of printhead 26. The varying of the carriage control signal controls carriage drivers 125 to regulate the power level supplied to the bidirectional motor to ensure that printhead 26 resides over the correct pixel during each print operation.

The output from encoder 107 not only supplies the information required to control the driving of printhead 26 across its rail 28, but that output also furnishes information utilized during print operations. Encoder 107 outputs each count representing the distance travelled by printhead 26 to counter 108. Counter 108 receives each count signal and increments in response. When counter 108 reaches a predetermined count value corresponding to the distance between pixels, it outputs a trigger signal to precision time generator 109. Responsive to that trigger signal, precision time generator 109 outputs a strobe signal that controls the printing of pixels by printhead 26.

In this preferred embodiment, counter 108 is a programmable counter to permit a user of printing system 10 to control the resolution of the printed image (i.e., the number of pixels per inch). The programmability of counter 108 allows the user to select the predetermined count value where counter 108 outputs its trigger signal. By varying the count value, the user selects the distance between each printed pixel and thus the number of printed pixels per inch (i.e., the resolution).

To ensure print controller 105 includes pixel information corresponding to the desired user resolution, the algorithm for converting the gray scale representation of the image contained in graphics computer 12 includes a routine that permits the user to select the resolution of the image for printing. After the revolution of the image has been selected, graphics computer 12 converts the scanned pixels into the number of pixels required to provide the user-selected resolution.

When counter 108 reaches its predetermined count level, it also outputs a data trigger signal to print controller 105 that informs print controller 105 to output the next set of eight pixels for printing by printhead 26. Upon receipt of the data trigger signal from counter 108, print controller 105 shifts the next eight pixels into data register 110. In this preferred embodiment, data register 110 includes four discrete registers that correspond to the four colors (i.e., cyan, magenta, yellow, black) that represent each pixel. Furthermore, each discrete register has at least an eight bit capacity to provide the data storage size necessary to print eight pixels and thus eight lines simultaneously.

Clock 111 provides a clock signal that determines the rate of transfer of pixels from data register 110 to printhead 26 and also prevents the skewing of transferred pixels. Once data register 110 has stored the thirty-two pixel bits representing the eight pixels among each of its four discrete registers, shift register 113 retrieves the first pixel bit from each of the four discrete registers because those four bits supply the print information necessary to control the top set (i.e., the first line) of printhead valves. After the retrieval of the first pixel bit from each of the four discrete registers of data registers 110, shift register 110 sequentially outputs each one of the four pixel bits to RS-422 output 114 upon the receipt of four successive clock pulses from clock 111.

Shift register 113 then retrieves the second pixel bit from each of the four discrete registers of data register 110 because the second four pixel bits supply the print information for the second set (i.e., second line) of valves controlling ink flow from printhead 26. Shift register 113 then sequentially outputs each one of the second four pixel bits to RS-422 output 114 upon the receipt of four successive clock pulses from clock 111. Shift register 113 successively retrieves four pixel bits from the four discrete registers until all eight pixel bits within each of the four discrete registers have been serially output to RS-422 output 114. Thus, in this preferred embodiment, shift register 113 is a parallel-to-serial device that serially transfers the thirty-two pixel bits stored within data register 110. Shift register 113 serializes the pixel bits because transferring the pixel bits in parallel would be impractical due to the large number of data lines required.

Clock ill also outputs its clock signal to counter 112 to furnish counter 112 with a pulse signal each time shift register 113 outputs a bit. Counter 112 receives each pulse signal and increments in response. When counter 112 reaches a predetermined count value corresponding to the number of pixel bits required to print eight lines (thirty-two pixel bits in this preferred embodiment), it outputs a framing signal to RS-422 output 114. The framing signal output by counter 112 prevents the skewing of the serialized pixel bits of data representing each of the eight pixels during their transfer to printhead 26.

In this preferred embodiment, counter 112 is a programmable counter to enable a user of printing system 10 to select the number of lines printhead 26 prints simultaneously. The programmability of counter 112 allows the user to select the number of lines printed because the user controls when counter 112 outputs a framing signal. For the purposes of illustration, if the user desired to increase the number of lines printed to 16, counter 112 would be programmed to output the framing signal after shift register 113 transferred 64 pixel bits of data representing 16 pixels.

As illustrated in FIGS. 12A and B, RS-422 output 114 and RS-422 receiver 115 function to prevent line interference noise during the transfer of the clock signal, the framing signal, the strobe signal, and the pixel bits to shift register 116. RS-422 output 114 and RS-422 receiver 115 are required because shift register 116 mounts on driver board 53 which is remote from print controller 105. Accordingly, RS-422 output 114 merely receives the above signals and increases their intensity before relaying the increased intensity signals to RS-422 receiver 115 which returns the signals to their normal level.

Clock 111 supplies its clock signal to shift register 116 to establish the transfer rate of pixel bits. In this preferred embodiment, shift register 116 includes an incoming register having at least a thirty-two bit capacity which receives and stores each pixel bit before shifting the pixel bits into an outgoing register of shift register 116 having at least a thirty-two bit capacity. Accordingly, as shift register 116 serially receives each pixel bit from shift register 113, it stores the pixel bits within its incoming register with each pixel bit being located within the incoming register based upon its position in the sequence of pixel bits.

As previously described, after shift register 113 serially outputs thirty-two pixel bits to the incoming register of shift register 116, counter 112 outputs a framing signal to shift register 116. After receipt of the framing signal, shift register 116 transfers the pixel bits in its incoming register to its outgoing register. Without the framing signal output from counter 112, shift register 116 would be unable to determine the sequence position of each pixel bit because there would be no delineation between pixel bits of the successive pixels forming the eight lines printed simultaneously. Consequently, the framing signal output by counter 112 frames the pixel bits so that shift register 116 recognizes when a complete set of pixel bits representing one vertical column of eight pixels has been received.

As previously described, when encoder 107 and counter 108 register that printhead 26 resides over a column of pixels, precision time generator 109 outputs a strobe signal to shift register 116 via RS-422 output 114 and RS-422 receiver 115. Upon receipt of the strobe signal, shift register 116 outputs each pixel bit within its outgoing register to relays 117. In this preferred embodiment, relays 117 and valves 118 each include at least thirty-two relays and thirty-two valves, respectively, to permit the printing of eight lines of an image simultaneously. Each bit of the outgoing register of shift register 116 connects to a separate relay so that the print information conveyed by each pixel bit controls a respective valve to either apply or not apply ink to substrate 25. The relays in this preferred embodiment are open-collectors that receive a pixel bit and, if the pixel bit is an "on" signal (i.e., a 1), the open-collectors activate to couple a respective valve of printhead 26 to a power source as previously described with reference to FIGS. 5–9.

The pixel bits are either an "on" signal (i.e., a 1) that opens a valve or an "off" signal (i.e., a 0) that maintains a valve closed. Shift register 116 applies each pixel bit to its respective relay until precision time generator 109 ceases outputting the strobe signal. Precision time generator 109 applies the strobe signal to shift register 116 for a constant predetermined time period to print each pixel to the identical density. That is, precision time generator 109 maintains its strobe signal for an identical time period for each pixel so that all pixels are printed to the same color density. However, although the print time period remains the identical throughout the printing of an image, precision time generator 109 may be programmed with a different strobe time before printing an image to provide a user of printing system 10 with the option changing the density of the pixels printed on substrate 25. Furthermore, different ink jets require different activation periods to produce similar results. Consequently, the variability of the strobe signal produced by precision time generator 109 permits the use of any type ink jet on printhead 26.

As previously described, in addition to triggering the strobe signal, counter 108 outputs a data trigger signal to initiate the transfer of the next set of pixel bits from print controller 105 to data register 110. Once the next set of pixel bits reside within data register 110, the pixel bits are transferred to the incoming register of shift register 116. Furthermore, after all the pixel bits have been transferred to the incoming register of shift register 116, counter 113 outputs a framing signal to initiate the transfer of the pixel bits into the outgoing register of shift register 116. Although the transfer of the next pixel bits to the incoming register of shift register 116 begins during the printing of pixel bits presently residing in the outgoing register of shift register 116, no pixel bits in the outgoing register will be overwritten by the next pixel bits because, due to system timing, the strobe signal ceases, thus stopping print operations, before counter 112 outputs its framing signal to transfer the next pixel bits from the incoming register to the outgoing register of shift register 116.

In this preferred embodiment, the ink jets or ink jet valves forming each of the four columns are offset horizontally to ensure that the ink ejected from one ink jet or ink jet valve will not affect other ink jets or ink jet valves. Furthermore, each of the four ink jets or ink jet valves forming each of the eight rows must be horizontally offset from each other in order to fit onto printhead 26. Consequently, the ink jets or ink jet valves forming the columns require successive delays in activation between the top ink jet or ink jet valve and the bottom ink jet or ink jet valve to produce a completely vertical column of pixels, while the ink jets or ink jet valves forming the rows require even greater compensation because they do not print the same pixel at the same time. However, print controller 105 easily compensates for the offsetting of both the rows and columns because each ink jet or ink jet valve is a known number of pixels apart from the first ink jet or ink jet valve in its row or column. Thus, print controller 105 merely places the required number pixel no prints (i.e., "off" signals) before pixel bits controlling offset ink jet or ink jet valves so that printing of the pixel bit will be delayed until the ink jet or ink jet valve actually resides over the correct pixel requiring printing.

Although print controller 105 does not transfer a set of pixel bits to shift register 116 until printhead 26 begins moving along rail 28, the image loses no printed pixels because each reproduced image includes a white border. Thus, even though the first column of pixels is an never be printed, it is unimportant because those pixels are always white. Furthermore, the border provides a number of no color pixels to provide print controller 105 with an opportunity to receive feedback from encoder 107 so that, by the time color pixels must be printed, the speed and thus the position of printhead 26 has been adjusted to provide exact alignment for each pixel printed.

When printhead 26 reaches the end of a printed line, encoder 107 provides a count number recognizable by print controller 105 as the end of a line. In response to that count signal, print controller 105 outputs a substrate advance signal to material driver 126. In this preferred embodiment, material driver 126 is a stepper motor translator that couples the roller drive stepper motor to a power source capable of delivering the current level required by the roller drive stepper motor. Print controller 105 maintains the substrate advance signal until substrate 25 has been driven by the roller drive stepper motor the number of lines corresponding to the number of ink jets or ink jet valves in a column. At the expiration of the substrate advancement time period, print controller 105 deactivates material driver 126 and reactivates carriage drivers 125 to begin the printing of the next lines of the image.

Figure 12:
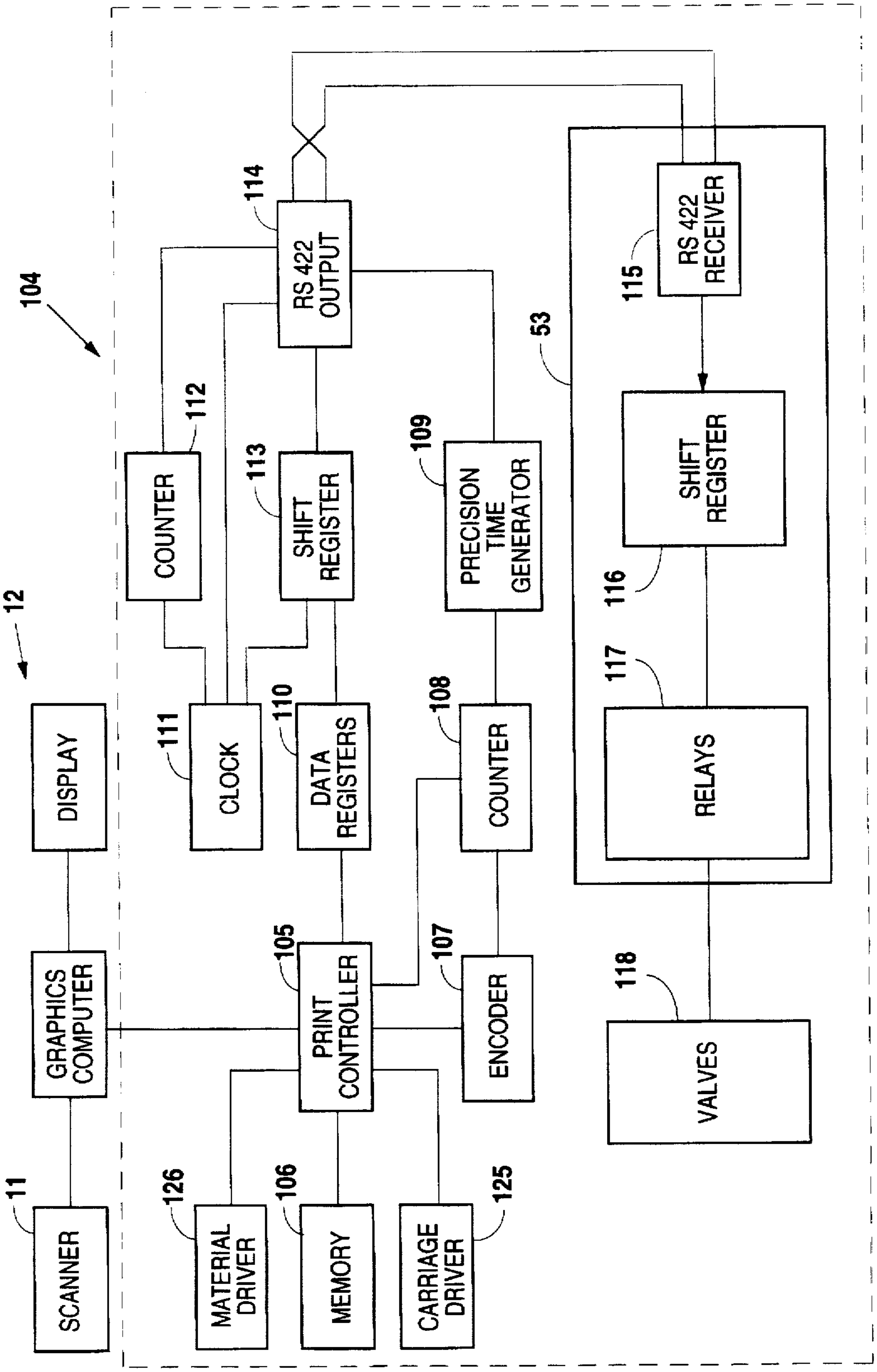
FIGS. 12A and 12B are schematic diagrams illustrating the print control system of the printing system printer.
Figure 13:
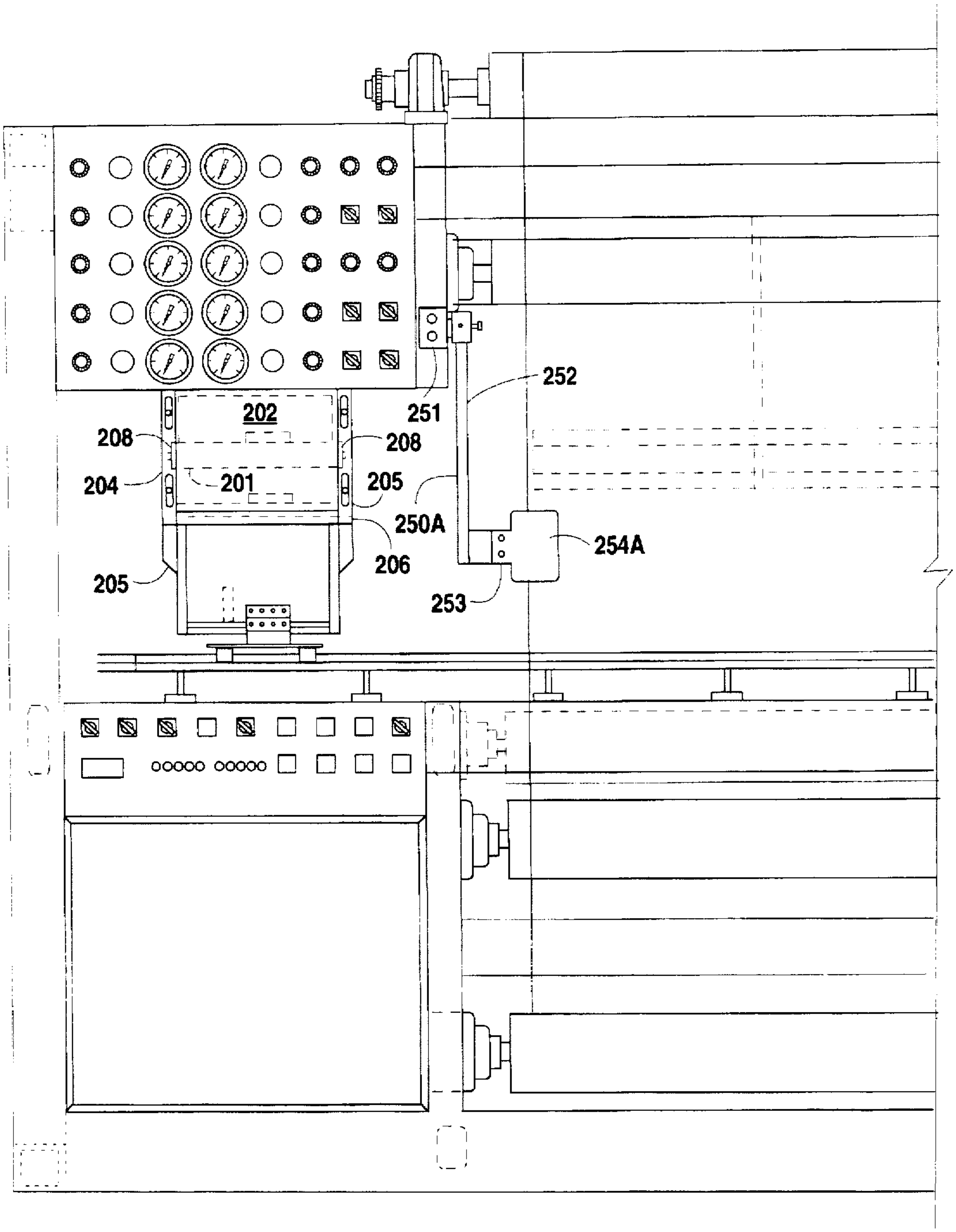
FIG. 13 is front plan view of the left side of the printing system printer illustrating the ink purge system.
Figure 14:
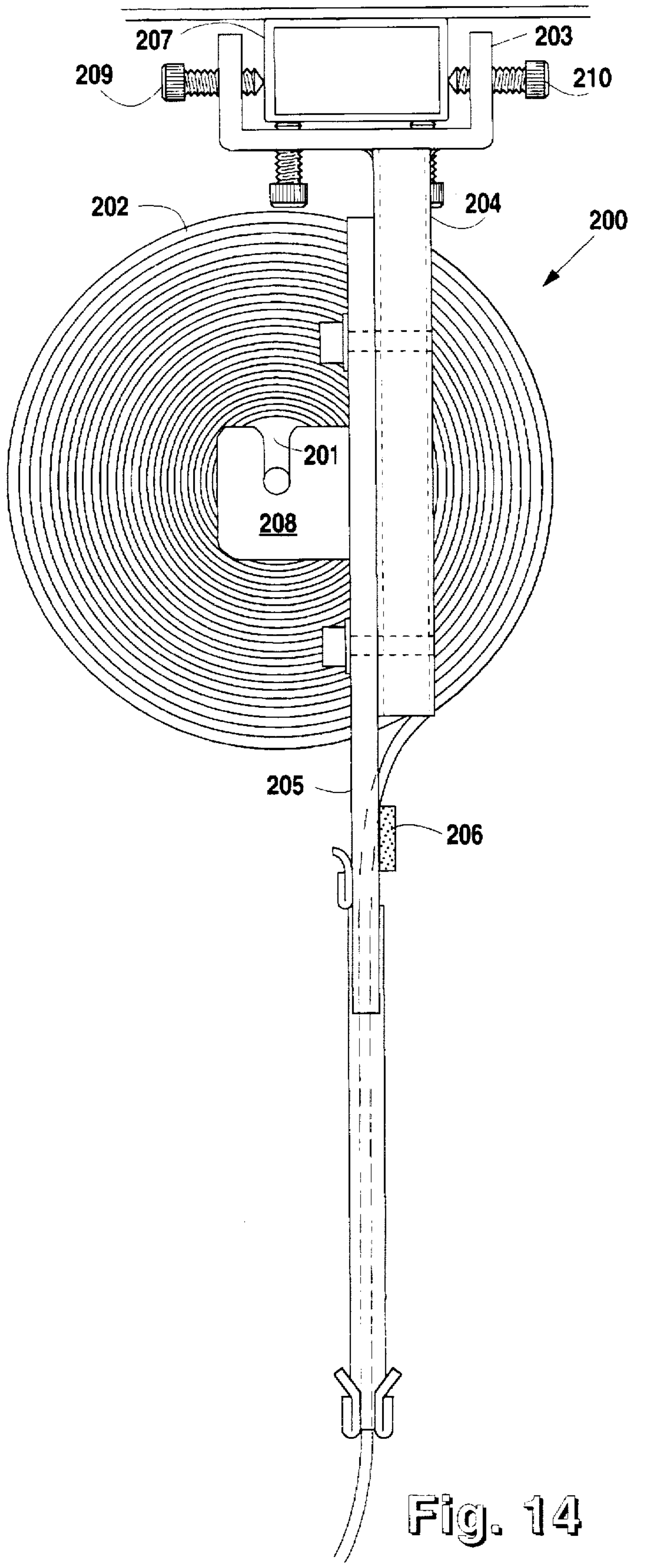
FIG. 14 is a partial side plan view illustrating the ink purge system of the printing system printer.

As illustrated in FIGS. 13 and 14, the ink purge system includes frame 200 used to support roller 201 about which is wound ink absorbent felt 202. Frame 200 includes U-shaped bracket 203, support bracket 204, guide member 205, brace 206, and a pair of roller supports 208. Frame 200 is positioned beyond the left edge of substrate 25 as shown in FIG. 12 and connected to framework tubing 207 of frame 15 using U-shaped bracket 203 and set screw 209 and 210 (see FIG. 13). Support bracket 204 is attached to U-shaped bracket 203 using any conventional means such as welding and serves to support guide member 205. Guide member 205 includes roller support 208 and is attached to support bracket 204 by any conventional means such as screws or nuts and bolts. Roller supports 208 are placed at opposite ends of guide member 205 and serve to hold roller 201 to allow the unwinding of ink absorbent felt 202 through guide member 205. Guide member 205 holds each end of ink absorbent felt 202 to prevent ink absorbent 202 from bunching up during unwinding. Place 206 provides tension between ink absorbent felt 202 and guide member 205 to further prevent the bunching up of ink absorbent felt 202 and guide member 205 to further prevent the bunching of ink absorbent felt 202. In use, ink absorbent felt 202 is initially pulled down until it reaches the bottom of guide member 205 where it remains during system operations. Once the exposed portion of ink absorbent felt 202 becomes covered with excessive ink, it is again pulled down to expose a clean portion, with the used portion being cut off and disposed.

To utilize the ink purge system, print controller 105 after the expiration of a user-selected time period signals carriage drivers 125 to drive print heads 26 and 27 or print head 42 beyond the edge of their respective substrate 25 or 40 and in front of ink absorbent felt 202. Once the print heads are in front of ink absorbent felt 202, print controller 105 activates each relay on driver board 53, resulting in each ink jet discharging ink onto ink absorbent felt 202. Print controller 105 maintains each ink jet activated until the expiration of a predetermined period, whereupon print controller 105 deactivates the ink jets and resumes normal print operations. The purge of each ink jet occurs to supply fresh ink to the print heads and prevent ink from drying on and clogging the ink jets.

Although the present invention has been described in terms of the foregoing embodiment, such description has been for exemplary purposes only and, as will be apparent to those of ordinary skill in the art, many alternatives, equivalents, and variations of varying degrees will fall within the scope of the present invention. That scope, accordingly, is not to be limited in any respect by the foregoing description, rather, it is defined only by the claims which follow.

We claim:

1. An apparatus for producing an image on a first side of a substrate and a mirror image on a second side of the substrate, comprising:

a computer that converts signals representing each pixel of the image in gray scale into signals representing each pixel of the image with a uniform density;

a first printhead driven relative to the first side of the substrate for applying ink to the first side of the substrate;

a second printhead driven relative to the second side of the substrate for applying ink to a second side of the substrate;

a substrate suspension system that supports a substrate feed roll, that drives the substrate relative to said first and second printhead from the substrate feed roll to a substrate rewind roll, and that tensions the substrate to maintain the substrate taut during the application of ink by said first and second printhead; and a print control system that inputs the signals representing each pixel of the image with a uniform density and utilizes those signals to control said first printhead to produce the image on the first side of the substrate and said second printhead to produce the mirror image on the second side of the substrate.

2. The apparatus according to claim 1 further comprising means for reducing the image into signals representing each pixel of the image in gray scale.

3. The apparatus according to claim 1 wherein said first and second printhead communicate with a source of pressurized ink.

4. The apparatus according to claim 1 wherein said first and second printhead communicate with a source of ink and a source of pressurized air that draws ink from the source of ink and ejects the ink from said first and second printheads.

5. The apparatus according to claim 1 wherein said first and second printhead communicate with a source of pressurized ink and a source of pressurized air that atomizes the ink ejected from said first and second printhead.

* * * * *